United States Patent
Wagner et al.

(10) Patent No.: US 10,095,055 B2
(45) Date of Patent: Oct. 9, 2018

(54) ATTENUATED LIGHT BEAM PEAK FREQUENCY MODIFICATION

(71) Applicant: VIAVI SOLUTIONS INC., Milpitas, CA (US)

(72) Inventors: Chris Wagner, Kanata (CA); Grant Tessaro, Ottawa (CA)

(73) Assignee: VIAVI SOLUTIONS INC., Milpitas, CA (US)

( * ) Notice: Subject to any disclaimer, the term of this patent is extended or adjusted under 35 U.S.C. 154(b) by 312 days.

(21) Appl. No.: 15/167,326

(22) Filed: May 27, 2016

(65) Prior Publication Data
US 2017/0082874 A1    Mar. 23, 2017

Related U.S. Application Data

(60) Provisional application No. 62/220,667, filed on Sep. 18, 2015.

(51) Int. Cl.
| | |
|---|---|
| G01J 1/00 | (2006.01) |
| G02F 1/01 | (2006.01) |
| G02F 1/133 | (2006.01) |
| H04B 10/40 | (2013.01) |
| H04B 10/079 | (2013.01) |
| H04B 10/516 | (2013.01) |
| G01J 3/28 | (2006.01) |

(52) U.S. Cl.
CPC ............ *G02F 1/0121* (2013.01); *G01J 3/28* (2013.01); *G02F 1/13306* (2013.01); *H04B 10/07955* (2013.01); *H04B 10/40* (2013.01); *H04B 10/516* (2013.01); *G01J 2003/2859* (2013.01)

(58) Field of Classification Search
CPC ............ G02B 17/08; G02B 2027/014; G02B 2027/0178; G02B 26/0808; G02B 27/01; G02B 27/017; G02B 27/0172; G02B 27/0176; G02B 3/0006; G02B 6/32; G02B 2006/0098; G02B 2027/0118; G02B 2027/0125
See application file for complete search history.

(56) References Cited

U.S. PATENT DOCUMENTS

| | | | |
|---|---|---|---|
| 6,219,011 B1* | 4/2001 | Aloni | G06F 3/147 345/1.3 |
| 2003/0001953 A1* | 1/2003 | Rancuret | H04N 5/7458 348/84 |
| 2017/0124935 A1* | 5/2017 | Hudson | G09G 3/2037 |

* cited by examiner

*Primary Examiner* — Michael P Stafira
(74) *Attorney, Agent, or Firm* — Mannava & Kang, P.C.

(57) ABSTRACT

According to an example, a plurality of pixels of a modulator upon which an input light beam impinges may be modulated to apply a first asymmetrical attenuation pattern on the input light beam and to direct a first attenuated light beam from the modulator and a first power level of the first attenuated light beam may be measured. The plurality of pixels may be modulated to apply a second asymmetrical attenuation pattern on the input light beam and to direct a second attenuated light beam from the modulator, and a second power level of the second attenuated light beam may be measured. A difference between the first power level and the second power level may be calculated and a modified peak frequency for an attenuated light beam from the calculated difference may be calculated.

20 Claims, 5 Drawing Sheets

ATTENUATED LIGHT BEAM PEAK FREQUENCY MODIFICATION

CLAIM FOR PRIORITY

This application claims priority from U.S. Provisional Application Ser. No. 62/220,667 filed on Sep. 18, 2015, the disclosure of which is incorporated by reference herein in its entirety.

BACKGROUND

A wavelength selective switch (WSS) may be used in a test and measurement application of a light source signal, such as a laser source signal. In this type of application, the WSS may be used to create a channel around the light source signal. For instance, the WSS may apply an attenuation pattern on the light source signal to output a channel containing the attenuated light beam from the WSS. A testing station that is to implement the test and measurement application may be positioned to receive the attenuated light beam.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on. The terms "first" and "second" as used herein are not intended to denote any particular order or placement of an element. Instead, these terms are used herein to denote that one element differs from another element.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures.

Over time, the light beam passing through a tunable filter may slowly drift in center (or peak) frequency. As the tunable filter's insertion loss or dispersion vs. frequency is typically not flat, the drift may result in a power change or dispersion change that may affect testing on the light beam. In addition, it may become necessary to change the wavelength selective switch channel center frequency range to match to the drifting light beam source. With traditional diffraction grating based filters, the filters are dithered in order to lock the filter peak to the laser frequency peak. However, this is typically not possible with the slow update rate of typical wavelength selective switch modules, which is typically in the 100s of milliseconds.

Disclosed herein are a method and an apparatus for calculating a modified peak frequency for an attenuated light beam, in which the attenuated light beam is to compensate for a drift in peak frequency of a light beam source. That is, an insertion loss pattern (or equivalently, an attenuation pattern) may be determined based upon the modified peak frequency, in which application of the insertion loss pattern is to cause the attenuated light beam to have a peak frequency that more closely matches the shifted peak frequency of the light beam source. In one regard, by more closely matching the peak frequency of the light beam source, the intensity or power level of the light beam from the light beam source may be maintained at a relatively constant level, which may result in more accurate testing conditions.

As discussed in greater detail herein, the method may include modulating a plurality of pixels of a modulator upon which an input light beam impinges to apply a first asymmetrical attenuation pattern on the input light beam and to direct a first attenuated light beam from the modulator, and measuring a first power level of the first attenuated light beam. The method may also include modulating the plurality of pixels to apply a second asymmetrical attenuation pattern on the input light beam and to direct a second attenuated light beam from the modulator, and measuring a second power level of the second attenuated light beam. The method may further include calculating a difference between the first power level and the second power level and calculating a modified peak frequency for an attenuated light beam from the calculated difference. According to an example, the first asymmetrical attenuation pattern and the second asymmetrical pattern may be mirror images of each other in frequency. In addition, the difference between the first and second power measurements may directly be related to the change in the peak frequency of the light beam source.

Through implementation of the method and apparatus disclosed herein, the drift in the peak frequency of the light beam source may be determined in a relatively simple and efficient matter. In addition, a modified attenuation pattern to compensate for the drift may be determined and a modulator in an optical transmission device, which may be a wavelength selective switch, may be controlled to modify the filter pattern applied on an input light beam from the light beam source in an asymmetric fashion. The power of the light beam source may be measured through an optical tap coupled to an optical detector, which may be a power meter.

According to an example, the filter channel of the light beam source may be shifted to center the light beam source without using a dither or temporarily rerouting or blocking the light beam signal from the light beam source. That is, for instance, an optical tap may be coupled to an output line to direct a relatively small portion of an attenuated light beam from the modulator to an optical detector such that the remainder of the attenuated light beam may be directed along the output line to a testing station. The testing station may be a wavelength division multiplexing (WDM) test station, which may employ tunable filters to select a single laser source from a grid of laser sources that make up the many channels on a single fiber.

Figure 1:
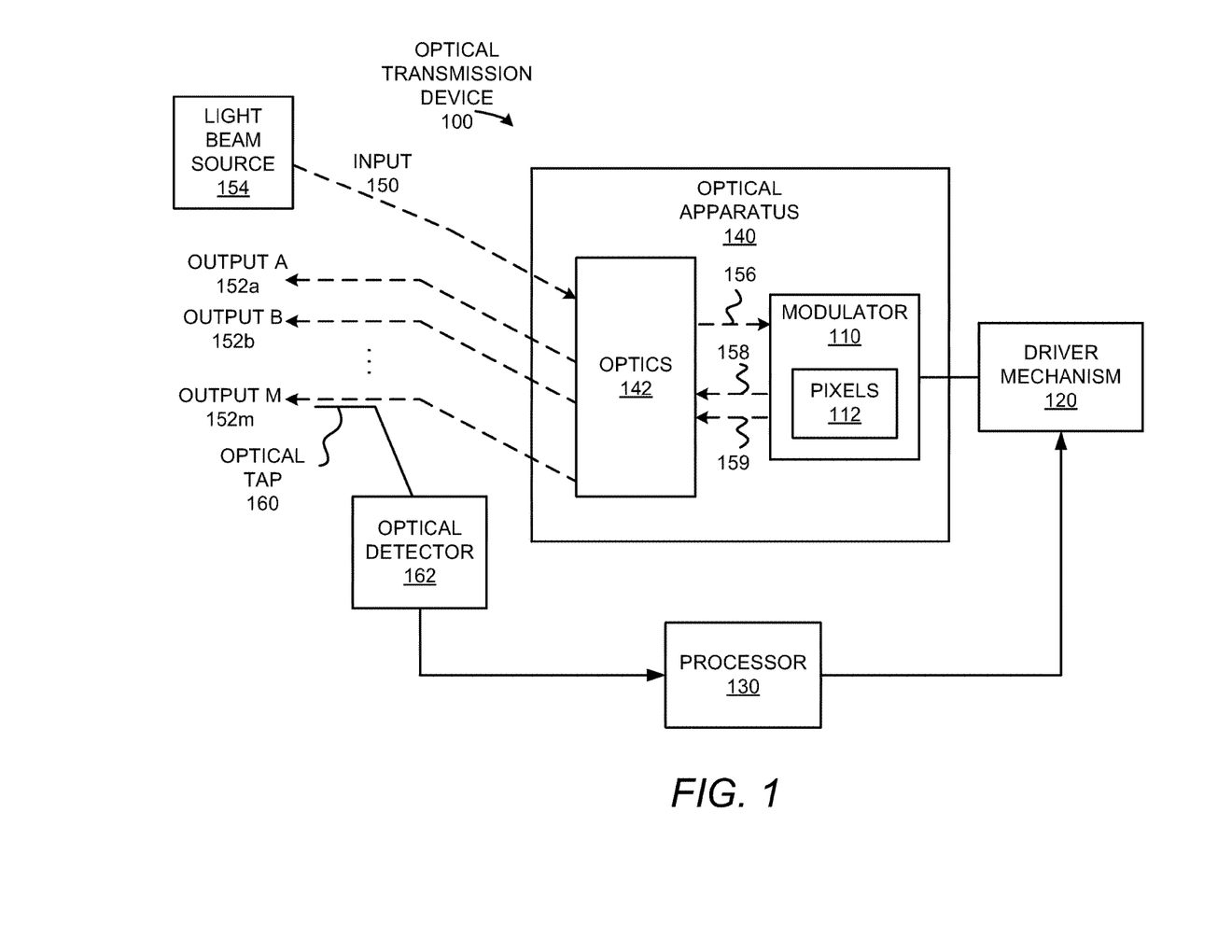
FIG. 1 shows a simplified block diagram of an optical transmission device, according to an example of the present disclosure.

With reference first to FIG. 1, there is shown a simplified block diagram of an optical transmission device 100 according to an example of the present disclosure. The optical transmission device 100 may include a modulator 110, a driver mechanism 120, a processor 130, an optical apparatus 140, an input 150 from a light beam source 154, a plurality of outputs 152a-152m, an optical tap 160, and an optical detector 162. The optical detector 162 may also include an amplifier (not shown). The modulator 110 may be a device that imposes spatially varying modulation on wavelengths of light that impinge on the modulator 110. According to an example, the modulator 110 is a liquid crystal on silicon (LCOS) panel. However, it should be understood that the spatial light modulator 110 may be formed of any other suitable type of panel.

The modulator 110 may be formed of a plurality of pixels 112, in which each of the pixels 112 may apply a predetermined level of insertion loss onto light impinging on the pixels 112, in which the level of insertion loss depends, for instance, upon a level of current or voltage applied to the pixels 112. For instance, the processor 130 may control the driver mechanism 120 to drive the pixels 112 such that the pixels 112 apply a predetermined attenuation pattern, e.g., a predetermined insertion loss pattern, on the impinging light beam. By way of example, the processor 130 may control the driver mechanism 120 to individually manipulate the pixels 112 (or to manipulate respective groups of pixels) to apply the predetermined attenuation pattern on an input light beam 156, in which the predetermined attenuation pattern results in an attenuated light beam 158 in which the intensity of the light beam has a predetermined shape.

The driver mechanism 120 may drive the pixels 112 such that the intensity of the attenuated light beam 158 has a Gaussian shape, e.g., a higher level of intensity near the center of the attenuated light beam 158 as compared with the outer edges of the attenuated light beam 158. That is, to create the Gaussian shape, the driver mechanism 120 may drive the pixels 112 at or near the center of the attenuation pattern to apply little to no insertion loss to the impinging light beam and may drive the pixels 112 that are farther away from the center of the attenuation pattern to apply higher levels of insertion loss to the impinging light beam.

Although particular reference is made herein to the modulator 110 being formed of pixels 112, it should be understood that the pixels 112 may equivalently be construed as being cells, panels, or the like. It should thus be understood that the terms pixels, cells, and panels may be used interchangeably herein.

According to an example, the optical apparatus 140 is a wavelength selective switch, a tunable filter, or the like, and the modulator 110 is a component of the optical apparatus 140. The optical apparatus 140 may include optics 142 that are to receive a light beam through an input 150, which may be an optical fiber that is to receive the light beam from a light beam source 154. The light beam source 154 may be laser light beam source and the light beam inputted through the input 150 may be a laser beam. The optics 142 may include any of a number of optical components, such as lenses, polarizers, mirrors, diffraction elements, beamsplitters, gratings, etc., to direct and disperse the inputted light beam 156 onto the pixels of the modulator 110. For instance, the optics 142 may direct and disperse the inputted light beam 156 such that the inputted light beam 156 impinges on a predetermined set of pixels.

The optics 142 may also include optical components, such as lenses, polarizers, mirrors, diffraction elements, beamsplitters, gratings, etc., to direct an output light beam, which is also referenced herein as an attenuated light beam 158, from the modulator 110 to the appropriate output 152a-152m, for instance, as selected by the modulator 110. The outputs 152a-152m, in which the variable "m" may represent an integer value greater than one, may also be optical fibers.

The light beam source 154 may initially (or equivalently, nominally) be set to direct the input light beam 156 into the optical apparatus 140 at a peak (or equivalently, center) wavelength. In addition, the processor 130 is to instruct the driver mechanism 120 to drive the pixels 112 in the modulator 110 according to an attenuation pattern that causes the input light beam 156 impinging on the pixels 112 to direct an attenuated light beam 158 having a Gaussian shape from the modulator 110. Particularly, the pixels 112 may be driven to cause the attenuated light beam 158 to have a symmetrical attenuation pattern centered around the initial (or nominal) peak (or central) wavelength. However, as discussed above, over time, the light beam source 154 may drift in initial (or nominal) peak wavelength. In this case, if the modulator 110 applies the same attenuation pattern onto the input light beam 156, a filter channel of the modulator 110 for the input light beam 156 will no longer be centered with the peak wavelength of the input light beam 156. This may result in a change in the intensity (or equivalently, power level) of the attenuated light beam 158, which may lead to inaccurate measurements. For instance, the intensity of the Gaussian shaped attenuated light beam 158 may be lower than expected or desired.

According to an example of the present disclosure, the processor 130 may implement a method for determining a modified attenuation pattern for the pixels 112 that shifts the filter channel of the modulator 110 for the input light beam 156 such that the filter channel is centered with the peak wavelength of the input light beam 156 from the light beam source 154. In addition, the processor 130 may instruct the driver mechanism 120 to drive the pixels 112 according to the modified attenuation pattern to thus compensate for the drift in the light beam source 154. For at least the reasons presented therein, the processor 130 may determine the modified attenuation pattern without using a dither or temporarily rerouting or blocking the attenuated light beam 158 from the modulator 110. In one regard, for instance, the processor 130 may determine and implement the modified attenuation pattern while a testing procedure is being performed using the optical transmission device 100 and thus may be performed without disrupting the testing procedure. In addition, the processor 130 may determine and implement the modified attenuation pattern without requiring that the entire attenuated light beam 158 be diverted to a wave meter or the like, which would require the disruption of the testing procedure.

As described in greater detail herein below, the processor 130 may determine the modified attenuation pattern by determining an offset between the initial (or nominal) peak (or center) wavelength and the shifted peak wavelength. Particularly, the processor 130 may determine the offset through manipulation of the modulator 110 pixels to apply multiple asymmetric optical filter patterns onto the attenuated light beam 158 and through a determination of a difference in power levels resulting from the application of the multiple asymmetric optical filter patterns onto the attenuated light beam 158.

Although the optical transmission device 100 is depicted as including a single input 150 and a single optical tap 160, it should be understood that the optical transmission device 100 may include multiple inputs 150, e.g., multiple light beam sources 154, and multiple optical taps 160. For instance, different light beam sources (not shown), e.g., laser beam sources, may input light beams through respective inputs 150. In this example, the processor 130 may control the driver mechanism 120 to manipulate the pixels in the modulator 110 to direct light beams from the light beam sources to respective ones of the outputs 152a-152m. In addition, optical taps (not shown) may be coupled to the respective outputs 152a-152m such that the intensities of the attenuated light beams from each of the light beam sources may individually be tracked.

Moreover, the processor 130 may receive the detected intensities of the attenuated light beams from the optical detector 162 (or multiple optical detectors) and may determine, from the detected intensities, respective offsets between the peak (or central) frequencies of the input light beams and the attenuated light beams. The processor 130 may determine respective offsets that may exist between the peak frequencies of the multiple input light beams and the respective central frequencies of the Gaussian shaped attenuated light beams from the modulator 110. The processor 130 may further determine respective modified attenuation patterns for the filter channels on the modulator 110 for each of the input light beams. The processor 130 may still further control the driver mechanism 120 to drive the modulator 110 pixels according to the attenuation patterns, e.g., drive respective sets of modulator 110 pixels according to respective attenuation patterns. Accordingly, it should be clearly understood that the descriptions of the single light beam source 154 and the single attenuated light beam 158 may be applied to additional light beam sources and attenuated light beams.

Various manners in which the processor 130 may be implemented are described in greater detail below with respect to FIGS. 2-4.

Figure 2:
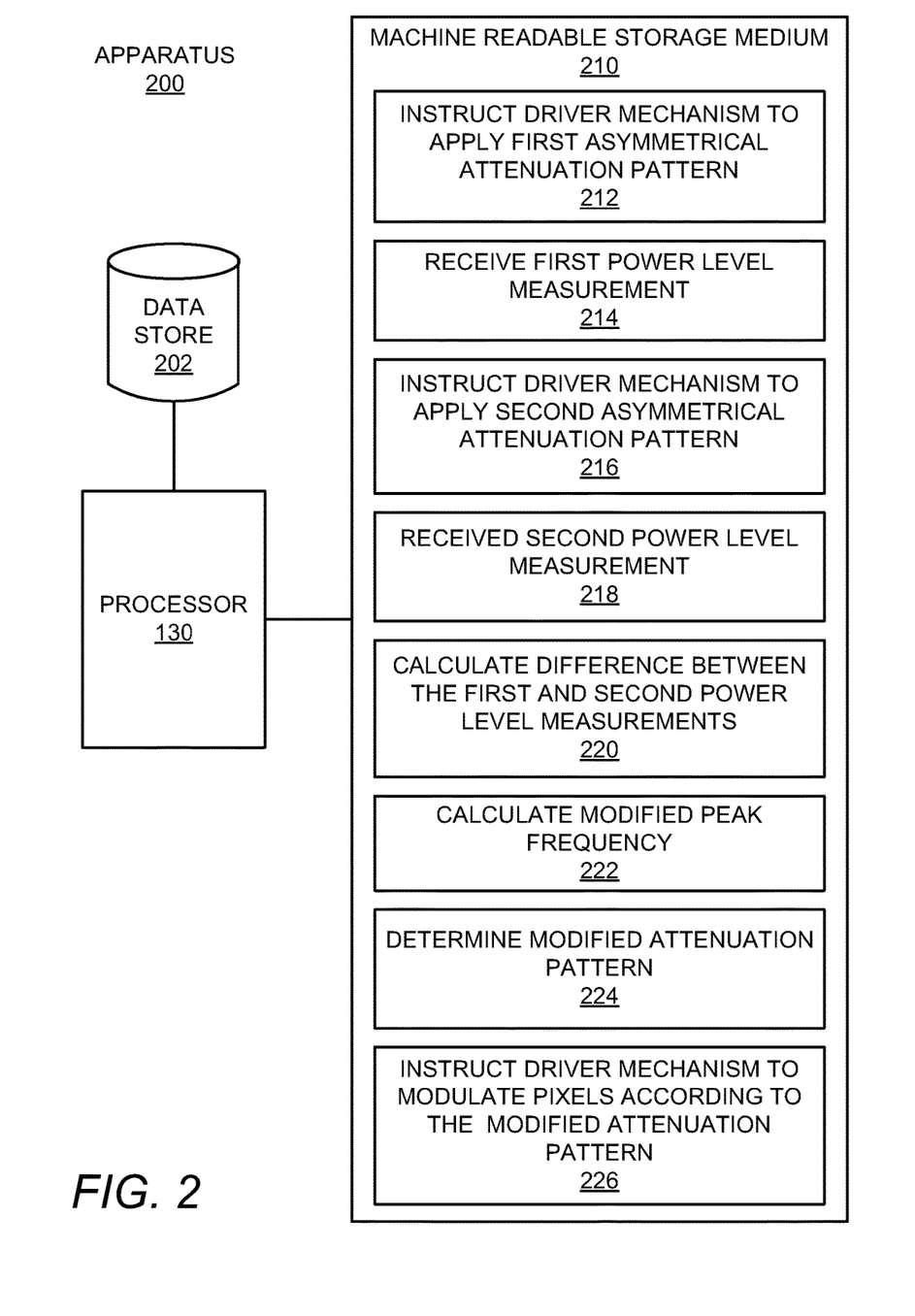
FIG. 2 shows a simplified block diagram of an apparatus that may include the processor depicted in FIG. 1, according to an example of the present disclosure.

With reference first to FIG. 2, there is shown a simplified block diagram of an example apparatus 200, which may include the processor 130. The apparatus 200 may be a computing device, e.g., a personal computer, a laptop computer, a server computer, a smartphone, a tablet computer, or the like. In one example, the apparatus 200 may be separate from the driver mechanism 120 and the optical detector 162 shown in FIG. 1. In this example, the processor 130 may communicate with the driver mechanism 120 and the optical detector 152 through a wired or a wireless connection. In another example, the driver mechanism 120 and/or the optical detector 162 may be included within the apparatus 200. In this example, the processor 130 may communicate with the driver mechanism 120 and/or the optical detector 162 through an internal bus (not shown). In any case, it should be understood that the apparatus 200 depicted in FIG. 2 may include additional components and that some of the components described herein may be removed and/or modified without departing from a scope of the apparatus 200.

The apparatus 200 is shown as including the processor 130 and a data store 202. The processor 130 may be a semiconductor-based microprocessor, a central processing unit (CPU), an application specific integrated circuit (ASIC), and/or other hardware device. The data store 202 may store, for instance, power level measurements received from the optical detector 162, modified attenuation patterns, etc. The data store 202 may be a Random Access Memory (RAM), an Electrically Erasable Programmable Read-Only Memory (EEPROM), a storage device, an optical disc, or the like.

The apparatus 200 is also depicted as including a machine readable storage medium 210 on which is stored machine readable instructions 212-226 that the processor 130 may execute. More particularly, the processor 130, which may be a hardware processor, may fetch, decode, and execute the instructions 212 to instruct the driver mechanism 120 to apply a first asymmetrical attenuation pattern on an input light beam 156 that impinges on a modulator 110 through modulation of the modulator 110 pixels 112. The instructions 212 may cause the processor 130 to output a control signal to the driver mechanism 120 to cause the driver mechanism 120 to apply the first asymmetrical attenuation pattern on the input light beam 156. The processor 130 may fetch, decode, and execute the instructions 214 to receive a first power level measurement of a first attenuated light beam 158 directed from the modulator 110 as detected by an optical detector 162. The optical detector 162 may detect the first power level measurement of the first attenuated light beam 158 and the instructions 214 may cause the processor 130 to receive the detected first power level measurement of the first attenuated light beam 158 from the optical detector 162.

The processor 130 may fetch, decode, and execute the instructions 216 to instruct the driver mechanism 120 to apply a second asymmetrical attenuation pattern on the input light beam 156 that impinges on the modulator 110 through modulation of the modulator 110 pixels. The processor 130 may fetch, decode, and execute the instructions 218 to receive a second power level measurement of a second attenuated light beam 159 directed from the modulator 110 as detected by the optical detector 162. The instructions 216 and 218 may cause the processor 130 to operate in manners discussed above with respect to the instructions 214 and 216.

The processor 130 may also fetch, decode, and execute the instructions 220 to calculate a difference between the first power level measurement and the second power level measurement. The processor 130 may also fetch, decode, and execute the instructions 222 to calculate a modified peak frequency for an attenuated light beam directed from the modulator 110 based upon the calculated difference between the first power level measurement and the second power level measurement. The processor 130 may further fetch, decode, and execute the instructions 224 to determine a modified attenuation pattern for the modulator 110 pixels corresponding to the calculated modified peak frequency. The processor 130 may still further fetch, decode, and execute the instructions 226 to instruct the driver mechanism 120 to modulate the modulator pixels 112 according to the modified attenuation pattern.

As an alternative or in addition to retrieving and executing instructions, the processor 130 may include one or more electronic circuits that include electronic components for performing the functionalities of the instructions 212-226. In addition or alternatively, the apparatus 200 may include a plurality of processors 130 and/or a processor 210 containing a plurality of cores.

The machine-readable storage medium 210 may be any electronic, magnetic, optical, or other physical storage device that contains or stores executable instructions. Thus, the machine-readable storage medium 210 may be, for example, Random Access Memory (RAM), an Electrically Erasable Programmable Read-Only Memory (EEPROM), a storage device, an optical disc, and the like. The machine-readable storage medium 210 may be a non-transitory machine-readable storage medium, where the term "non-transitory" does not encompass transitory propagating signals.

Figure 3:
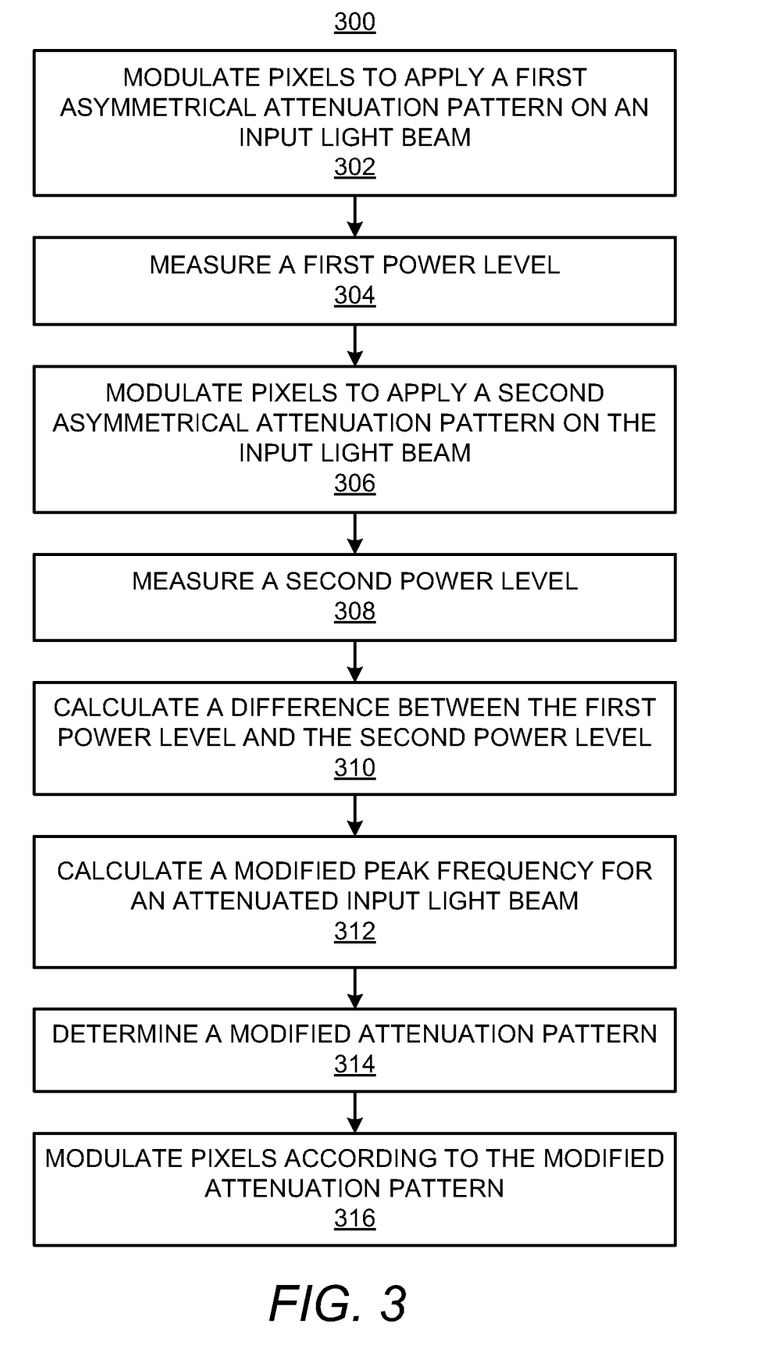
FIG. 3 shows a flow diagram of a method for calculating a modified peak frequency for an attenuated light beam, according to an example of the present disclosure.

Turning now to FIG. 3, there is shown a method 300 for calculating a modified peak frequency for an attenuated light beam, according to an example of the present disclosure. It should be apparent to those of ordinary skill in the art that the method 300 may represent a generalized illustration and that other operations may be added or existing operations may be removed, modified, or rearranged without departing from a scope of the method 300.

The description of the method 300 is made with reference to the optical transmission device 100 illustrated in FIG. 1 and the apparatus 200 illustrated in FIG. 2 for purposes of illustration. It should, however, be clearly understood that apparatuses having other configurations may be implemented to perform the method 300 without departing from the scope of the method 300.

At block 302, a plurality of pixels 112 of a modulator 110 upon which an input light beam 156 impinges may be modulated to apply a first asymmetrical attenuation pattern on the input light beam 156 and to direct a first attenuated light beam 158 from the modulator 110. For instance, the processor 130 may execute the instructions 212 to instruct the driver mechanism 120 to apply the first asymmetrical attenuation pattern on the input light beam 156. As discussed above, the first asymmetrical attenuation pattern may be an insertion loss pattern that is not symmetrical with respect to a Gaussian channel containing an initial (or nominal) peak (or central) wavelength of the input light beam 156. That is, the level of insertion loss may be higher or lower on one frequency side of the Gaussian channel as compared with the level of insertion loss on the opposite side of the Gaussian channel.

At block 304, a first power level of the first attenuated light beam 158 may be measured. For instance, the optics 142 may direct the first attenuated light beam 158 from the modulator 110 to an output 152m on which an optical tap 160 has been coupled. The optical tap 160 may divert a relatively small percentage of the first attenuated light beam 158 to an optical detector 162. The optical detector 162 may include a sensor (not shown) that is to measure the first power level (e.g., intensity level) of the first attenuated light beam 158. For instance, the processor 130 may execute the instructions 214 to receive the measured first power level from the optical detector 162. The processor 130 may also store the measured first power level in the data store 202.

In one regard, through use of the optical tap 160 coupled to the output 152m, the power level of the first attenuated light beam 158 may be measured without directing all of the first attenuated light beam 158 away from the outputs 152a-152m. Instead, a majority of the first attenuated light beam 158 may pass out of the optical tap 160 and through the output 152m. According to an example, a test station (not shown) may receive the first attenuated light beam 158 through the output 152m. As such, the test performed by the test station may not need to be disrupted during implementation of the method 300.

At block 306, a plurality of pixels of the modulator 110 upon which the input light beam 156 impinges may be modulated to apply a second asymmetrical attenuation pattern on the input light beam 156 and to direct a second attenuated light beam 159 from the modulator 110. For instance, the processor 130 may execute the instructions 216 to instruct the driver mechanism 120 to apply the second asymmetrical attenuation pattern on the input light beam 156. The second asymmetrical attenuation pattern may be an insertion loss pattern that is not symmetrical with respect to the Gaussian channel containing an initial (or nominal) peak (or central) wavelength of the input light beam 156. That is, the level of insertion loss may be higher or lower on one side of the Gaussian channel as compared with the level of insertion loss on the opposite side of the Gaussian.

Figure 4:
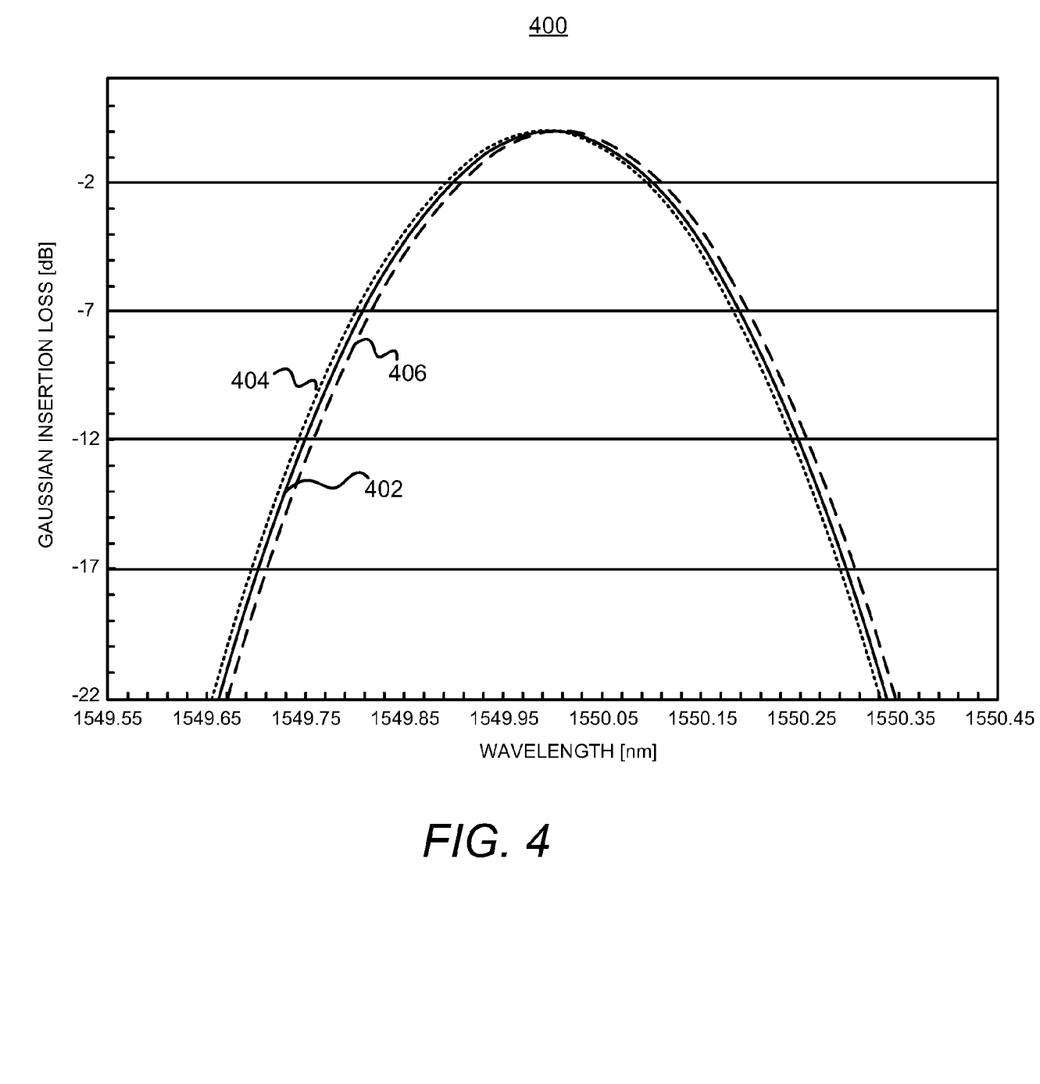
FIG. 4 shows a graph that depicts an initial Gaussian channel, a first Gaussian channel, and a second Gaussian channel resulting from multiple attenuation patterns, according to an example of the present disclosure.

With reference to FIG. 4, there is shown an example graph 400 that depicts an initial Gaussian channel 402 resulting from application of an initial symmetrical attenuation pattern, a first Gaussian channel 404 resulting from application of the first asymmetrical attenuation pattern, and a second Gaussian channel 406 resulting from application of the second asymmetrical attenuation pattern. As shown, the example graph 400 plots the wavelengths (in nm) of the Gaussian channels 402-406 with respect to the Gaussian insertion loss (in dB). In the example shown in FIG. 4, the first Gaussian channel 404 has a lower insertion loss along the lower frequency side of the Gaussian channel 404 and a higher insertion loss along the higher frequency side of the Gaussian channel 404 with respect to the initial Gaussian channel 402. In addition, the second Gaussian channel 406 has a higher insertion loss along the lower frequency side of the Gaussian channel 406 and a lower insertion loss along the higher frequency side of the Gaussian channel 406 with respect to the initial Gaussian channel 402. Moreover, the second Gaussian channel 406 is depicted as being a mirror image of the first Gaussian channel 404.

With reference back to FIG. 3, at block 308, a second power level of the second attenuated light beam 159 may be measured. For instance, the optics 142 may direct the second attenuated light beam 159 from the modulator 110 to the output 152m on which an optical tap 160 has been coupled. A relatively small portion of the second attenuated light beam 159 may be diverted to the optical detector 162 and a second power level (e.g., intensity level) of the second attenuated light beam 159 detected by the optical detector 162 may be communicated to the processor 130, which may store the measured first power level in the data store 202.

As discussed above, the optical tap 160 may enable the power level of the second attenuated light beam 159 to be measured without directing all of the second attenuated light beam 159 away from the outputs 152a-152m.

Figure 5:
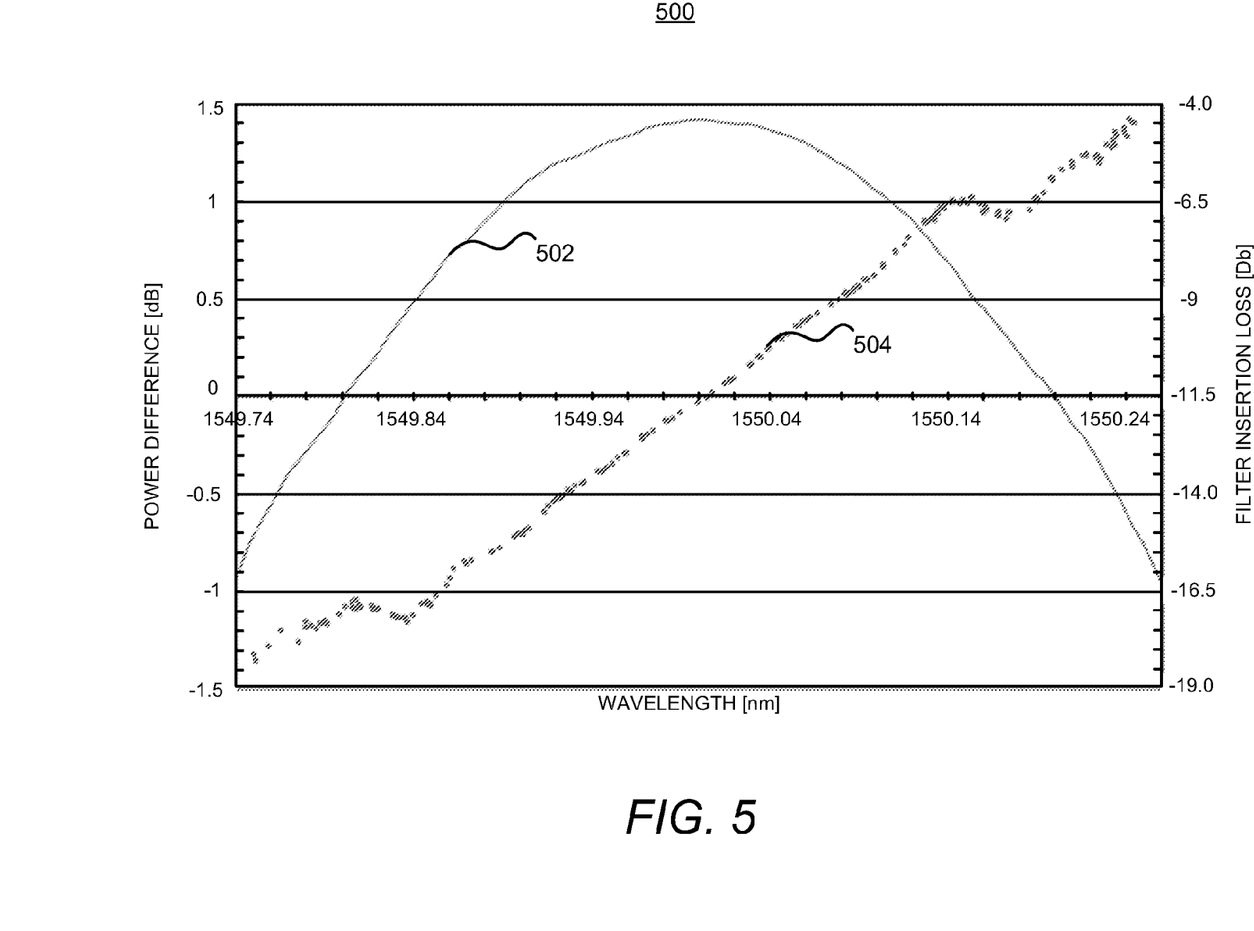
FIG. 5 shows a plot of a Gaussian channel of attenuated light from a modulator and differences in power at a plurality of wavelengths of the Gaussian channel, according to an example of the present disclosure.

At block 310, a difference between the first power level and the second power level may be calculated. For instance, the processor 130 may execute the instructions 220 to calculate a difference in power (e.g., in dB) between the first power level and the second power level over the Gaussian filter channel of the input light beam 156. An example graph 500 of the calculated differences between a plurality of randomly tuned peak centers is depicted in FIG. 5. The graph 500 depicts a plot of a Gaussian channel 502 of attenuated light from the modulator 110 and the differences in power 504 at a plurality of wavelengths of the Gaussian channel 502. As shown in the graph 500, there may be a relatively linear relationship between the differences in power 504 and a center (or peak) wavelength of the light beam source 154.

With reference back to FIG. 3, at block 312, a modified peak frequency for an attenuated light beam may be calculated from the calculated difference between the first power level and the second power level. For instance, the processor 130 may execute the instructions 222 to calculate the modified peak frequency.

At block 314, a modified attenuation pattern for the plurality of pixels 112 in the modulator 110 that corresponds to the calculated modified peak frequency may be determined. For instance, the processor 130 may execute the instructions 224 to determine a modified attenuation pattern for the pixels 112 that results in the attenuated light beam 158 directed from the modulator 110 to have the modified peak frequency calculated at block 312.

At block 316, the pixels 112 may be modulated according to the modified attenuation pattern. For instance, the processor 130 may execute the instructions 226 to instruct the driver mechanism 120 to modulate the pixels 112 upon which the input light beam 156 impinges to apply the modified attenuation pattern on the input light beam 156.

Through implementation of the method 300, the peak frequency of an attenuated light beam from the modulator 110 may be modified to thus compensate for a drift in the peak frequency of the light beam source 154. The power level of the light beam 158 outputted from the optical transmission device 100 may be maintained at a relatively constant level. By maintaining the power level of the outputted light beam at a relatively constant level, testing performed using the outputted light beam may not be negatively affected by the drift in the peak frequency of the light beam source 154. In addition, as described above, the method 300 may be implemented without disrupting or suspending operation of a testing station on the outputted light beam. The method 300 may also be implemented at periodic intervals to thus compensate for additional drifts in the peak frequency of the light beam source 154.

Some or all of the operations set forth in the method 300 may be contained as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   modulating a plurality of pixels of a modulator upon which an input light beam impinges to apply a first asymmetrical attenuation pattern on the input light beam and to direct a first attenuated light beam from the modulator;
   measuring a first power level of the first attenuated light beam;
   modulating the plurality of pixels to apply a second asymmetrical attenuation pattern on the input light beam and to direct a second attenuated light beam from the modulator;
   measuring a second power level of the second attenuated light beam;
   calculating a difference between the first power level and the second power level; and
   calculating a modified peak frequency for an attenuated light beam from the calculated difference.

2. The method according to claim 1, further comprising:
   determining a modified attenuation pattern for the plurality of pixels corresponding to the calculated modified peak frequency; and
   modulating the plurality of pixels according to the modified attenuation pattern.

3. The method according to claim 1, wherein determining the modified attenuation pattern further comprises determining the modified attenuation pattern to be an attenuation pattern that moves a peak frequency of the modified attenuation pattern to match a shift in a peak frequency in the input light beam.

4. The method according to claim 1, wherein the difference between the first power level and the second power level is linearly proportional to a difference in a frequency of a source of the input light beam to a center frequency of an applied attenuation pattern on the by input light beam by the modulator, and wherein calculating the modified peak frequency further comprises calculating the modified peak frequency from a linearly proportional relationship between the first power level and the second power level.

5. The method according to claim 1, wherein modulating the plurality of pixels to apply the first asymmetrical attenuation pattern further comprises modulating the plurality of pixels from a symmetrical attenuation pattern, wherein the symmetrical attenuation pattern applies the same level of insertion loss on both lower frequency and higher frequency sides of an initial peak frequency of the input light beam.

6. The method according to claim 1, wherein modulating the plurality of pixels of the modulator to apply the first asymmetrical attenuation pattern further comprises modulating the plurality of pixels to lower an insertion loss along a lower frequency side of the attenuated light beam and to raise the insertion loss along a higher frequency side of the attenuated light beam.

7. The method according to claim 6, wherein modulating the plurality of pixels of the modulator to apply the second asymmetrical attenuation pattern further comprises modulating the plurality of pixels to raise an insertion loss along a lower frequency side of the attenuated light beam and to lower the insertion loss along a higher frequency side of the attenuated light beam.

8. The method according to claim 1, wherein modulating the plurality of pixels to apply the second asymmetrical attenuation pattern further comprises modulating the plurality of pixels to apply the second asymmetrical attenuation pattern to be a mirror image of the first asymmetrical attenuation pattern.

9. The method according to claim 1, wherein calculating the modified peak frequency of the input light beam from the calculated difference further comprises calculating the modified peak frequency as the frequency corresponding to a minimized calculated difference.

10. A system comprising:
a driver mechanism to modulate a plurality of pixels of a modulator;
an optical detector to detect a characteristic of a light beam directed from the modulator;
a processor to:
instruct the driver mechanism to apply a first asymmetrical attenuation pattern on an input light beam that impinges on the modulator through modulation of the plurality of pixels to direct a first attenuated light beam from the modulator;
receive a first power level measurement of the first attenuated light beam from the optical detector;
instruct the driver mechanism to apply a second asymmetrical attenuation pattern on the input light beam through modulation of the plurality of pixels to direct a second attenuated light beam from the modulator;
receive a second power level measurement of the second attenuated light beam from the optical detector; and
calculate a modified peak frequency for an attenuated light beam directed from the modulator based upon the first power level measurement and the second power level measurement.

11. The system according to claim 10, wherein the processor is further to:
calculate a difference between the first power level measurement and the second power level measurement; and
calculate the modified peak frequency for the attenuated light beam based upon the calculated difference.

12. The system according to claim 10, wherein to calculate the modified peak frequency, the processor is further to calculate the modified peak frequency to be equivalent to a frequency that corresponds to a minimized calculated difference.

13. The system according to claim 10, wherein the processor is further to:
determine a modified attenuation pattern for the plurality of pixels corresponding to the calculated modified peak frequency; and
instruct the driver mechanism to modulate the plurality of pixels according to the modified attenuation pattern.

14. The system according to claim 10, wherein the first asymmetrical attenuation pattern includes a lower insertion loss along a lower frequency side of the attenuated light beam and a higher insertion loss along a higher frequency side of the attenuated light beam and wherein the second asymmetrical attenuation pattern includes a higher insertion loss along the lower frequency side of the attenuated light beam and a lower insertion loss along a higher frequency side of the attenuated light beam.

15. The system according to claim 10, wherein the first asymmetrical attenuation pattern and the second asymmetrical attenuation pattern are offset from a symmetrical attenuation pattern and are mirror images of each other, and wherein the symmetrical attenuation pattern includes identical insertion losses on both a lower frequency side and a higher frequency side of an initial peak frequency of the input light beam.

16. A non-transitory computer readable storage medium on which is stored machine readable instructions that when executed by a processor cause the processor to:
cause a first asymmetrical attenuation pattern to be applied on an input light beam that impinges on a modulator through modulation of a plurality of pixels to direct a first attenuated light beam from the modulator;
receive a first power level measurement of the first attenuated light beam;
cause a second asymmetrical attenuation pattern to be applied on the input light beam through modulation of the plurality of pixels to direct a second attenuated light beam from the modulator;
receive a second power level measurement of the second attenuated light beam from the optical detector; and
calculate a modified peak frequency for an attenuated light beam from directed from the modulator based upon the first power level measurement and the second power level measurement.

17. The non-transitory computer readable storage medium according to claim 16, wherein the machine readable instructions are further to cause the processor to:
calculate a difference between the first power level measurement and the second power level measurement; and
calculate the modified peak frequency for the attenuated light beam based upon the calculated difference.

18. The non-transitory computer readable storage medium according to claim 16, wherein to calculate the modified frequency, the machine readable instructions are further to cause the processor to:
calculate the modified peak frequency to be equivalent to a frequency that corresponds to a minimized calculated difference.

19. The non-transitory computer readable storage medium according to claim 16, wherein the machine readable instructions are further to cause the processor to:
determine a modified attenuation pattern for the plurality of pixels corresponding to the calculated modified peak frequency; and
cause the plurality of pixels to be modulated according to the modified attenuation pattern.

20. The non-transitory computer readable storage medium according to claim 16, wherein the first asymmetrical attenuation pattern and the second asymmetrical attenuation pattern are offset from a symmetrical attenuation pattern and are mirror images of each other, and wherein the symmetrical attenuation pattern includes identical insertion losses on both a lower frequency side and a higher frequency side of an initial peak frequency of the input light beam.

\* \* \* \* \*